United States Patent
Vali et al.

(10) Patent No.: US 11,323,434 B1
(45) Date of Patent: May 3, 2022

(54) SYSTEM AND METHOD FOR SECURE TWO FACTOR AUTHENTICATION

(71) Applicant: Charles Schwab & Co., Inc., San Francisco, CA (US)

(72) Inventors: Riyaz Vali, San Francisco, CA (US); Charles E. Gotlieb, San Francisco, CA (US)

(73) Assignee: Charles Schwab & Co., Inc., Westlake, TX (US)

(*) Notice: Subject to any disclaimer, the term of this patent is extended or adjusted under 35 U.S.C. 154(b) by 297 days.

(21) Appl. No.: 16/237,604

(22) Filed: Dec. 31, 2018

Related U.S. Application Data (60) Provisional application No. 62/612,605, filed on Dec. 31, 2017.

(51) Int. Cl.
*H04L 29/06* (2006.01)
*G06F 21/62* (2013.01)

(52) U.S. Cl.
CPC ........ *H04L 63/0853* (2013.01); *G06F 21/629* (2013.01); *H04L 63/102* (2013.01); *G06F 2221/2117* (2013.01); *H04L 2463/082* (2013.01)

(58) Field of Classification Search
CPC ............... H04L 63/0853; H04L 63/102; H04L 2463/082; G06F 21/629; G06F 2221/2117
See application file for complete search history.

(56) References Cited

U.S. PATENT DOCUMENTS

| | | | |
|---|---|---|---|
| 10,735,196 B2 * | 8/2020 | Shastri | ................ H04L 63/0853 |
| 2011/0219427 A1 * | 9/2011 | Hito | ........................ H04L 63/18 726/3 |

* cited by examiner

*Primary Examiner* — Fatoumata Traore
*Assistant Examiner* — Hamid Talaminaei
(74) *Attorney, Agent, or Firm* — Innovation Partners LLC; Charles E. Gotlieb (57) ABSTRACT

A system and method allows an app to be used to signal a server to authenticate a user using two factor authentication. The app is one previously associated with a user account, optionally using a different form of two factor authentication.

18 Claims, 4 Drawing Sheets

SYSTEM AND METHOD FOR SECURE TWO FACTOR AUTHENTICATION

RELATED APPLICATION

This application claims the benefit of U.S. Provisional Patent Application Ser. No. 62/612,605, entitled "Method and Apparatus for Secure Two Factor Authentication" filed by Riyaz Vali on Dec. 31, 2017, having the same assignee as the present application and is hereby incorporated by reference in its entirety.

FIELD OF THE INVENTION

The present invention is related to computer hardware and software and more specifically to computer hardware and software for authenticating users using two factor authentication.

BACKGROUND OF THE INVENTION

Two factor authentication allows a user to log into a web site with an extra layer of security, allowing the user attempting to log in by not only proving their identity with something they know, like a user identifier and password, but also with something like they have, like a phone or mobile device. Conventional two factor authentication causes a code to be generated and sent to a phone, either by voice or text, and the user then enters the code to the web site to which they are attempting to log in. The web site then compares the code to the one provided and allows the user to log in if they match, in addition to providing a user identifier and password on the account being logged into.

As smart phones have become more common for use in two factor authentication, bad actors have been able to trick cell phone providers into substituting their own SIM card for that of the user. That allows voice calls and messages to be routed to the bad actor, who can then hijack the code and log in, if they have discovered your username and password and know your cell number.

Dedicated applications have sprung up to plug this security hole. The application generates its code using an algorithm that also runs on a special server to generate an identical code. The user is provided the code on the app and provides it to the web server they are using to log in. The web server can then ask the special server for the next code in the sequence, which is technically the code the user wills see on the dedicated app. The user can then enter that code for the web server to use to compare.

However, a bad actor can crack the technique used to generate the codes and have access to the account. Additionally, it requires a separate application to be installed on the user's mobile device that they will have with them, taking additional memory for the dedicated application and is thus represents an inefficient manner of providing this additional security over the text or phone method that uses applications the user already has. Additionally, all techniques requires the user to copy the code accurately, causing additional computing resources to be used when the user mistypes the code. What is needed is a system and method that does not require these computing resources, and can make the computers involved run more efficiently.

SUMMARY OF INVENTION

A system and method allows the user to register an account on a server, log into the account at the server via a web interface on a conventional computer system and log into the account via an app, or otherwise authenticate an app to the server as being able to access the account. The server will receive the device identifier of the device running the app and associate it with the account authenticated.

The user may then enable two-factor authentication to be used when the web interface is used to access the user's account, or the server may otherwise determine that two factor authentication should be used, such as when the user attempts to log in via the web interface from a computer system that has not previously or recently been used to log into the account.

In such case, the user is instructed to use the app to signal that he or she is the one logging in via the web interface, either by navigating to a page of the app or by clicking on a notification sent to the user's device that brings the user to such a page. The device to which the notification is sent may be one specified by the user if the user has associated multiple devices with the account.

The user can then use a user interface element on the page of the app to indicate that they are the person logging into the web interface, optionally without logging in to the app. The app signals the server by computing a PIN that is a function of the device identifier of the device running the app and the date and time and sending the PIN to the server. The server computes the PIN or several versions of the PIN using the same or similar technique and then compares the PIN received from the app to the one or more versions it computed, and if one of them matches the PIN received, the server logs the user in via the web interface.

No dedicated app is required to be installed on the user's device, and the user is not required to copy codes from one device to the next, making the entire process more efficient for the computer systems involved.

DETAILED DESCRIPTION OF A PREFERRED EMBODIMENT

Figure 1:
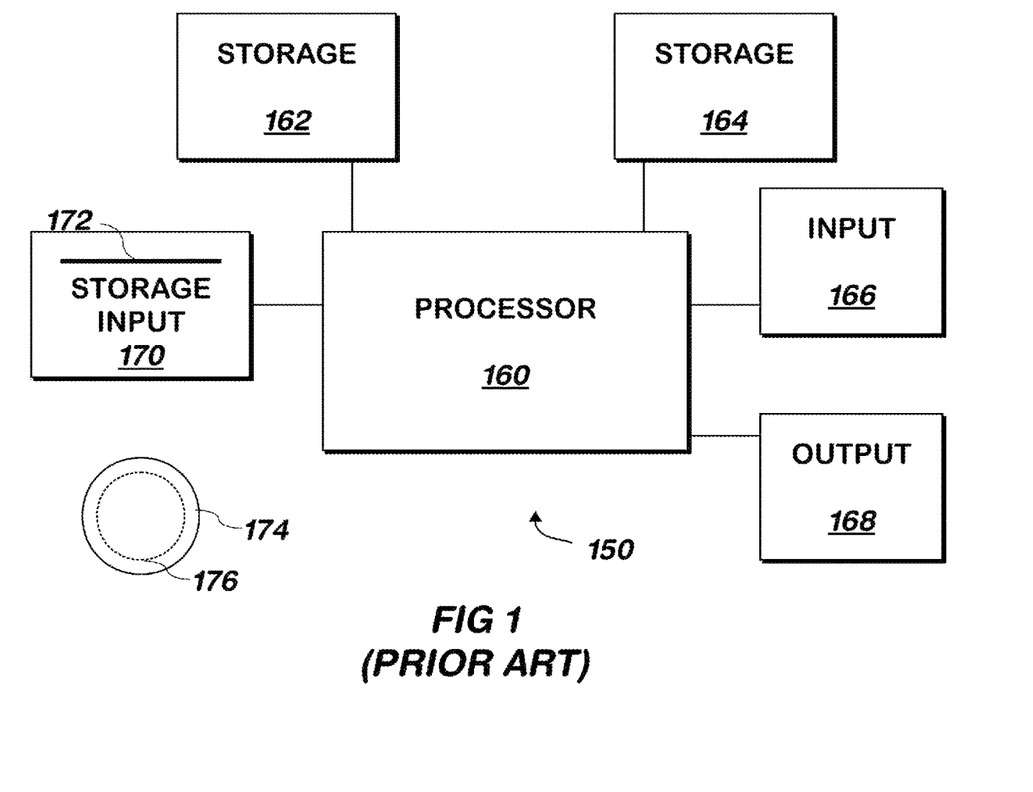
FIG. 1 is a block schematic diagram of a conventional computer system.

The present invention may be implemented as computer software running on a conventional computer system, computer software embodied on a non-transitory storage media, dedicated hardware components performing the functions described herein via firmware and a processor or via custom logic circuitry, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile (i.e. non-transitory) storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Set Up Account on Server

Figure 2:
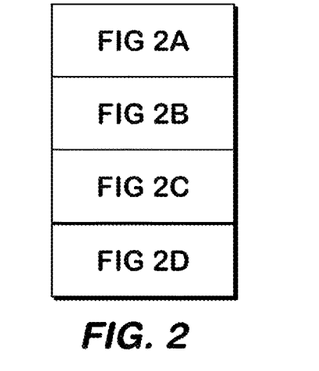
FIG. 2, consisting of FIG. 2A, FIG. 2B, FIG. 2C and FIG. 2D, is a flowchart illustrating a method of authenticating a user to a web interface according to one embodiment of the present invention.

Referring now to FIG. 2, consisting of FIGS. 2A, 2B, 2C and 2D, a method of authenticating a user to log into an account on a server is shown according to one embodiment of the present invention. Registration information is received from, and/or provided to, a user 210, including user identifier and password and second factor authentication information, such as a telephone number. An account is added to a server and associated with the information as part of step 210. A unique account identifier may be assigned and stored associated with the account.

Figure 2A:
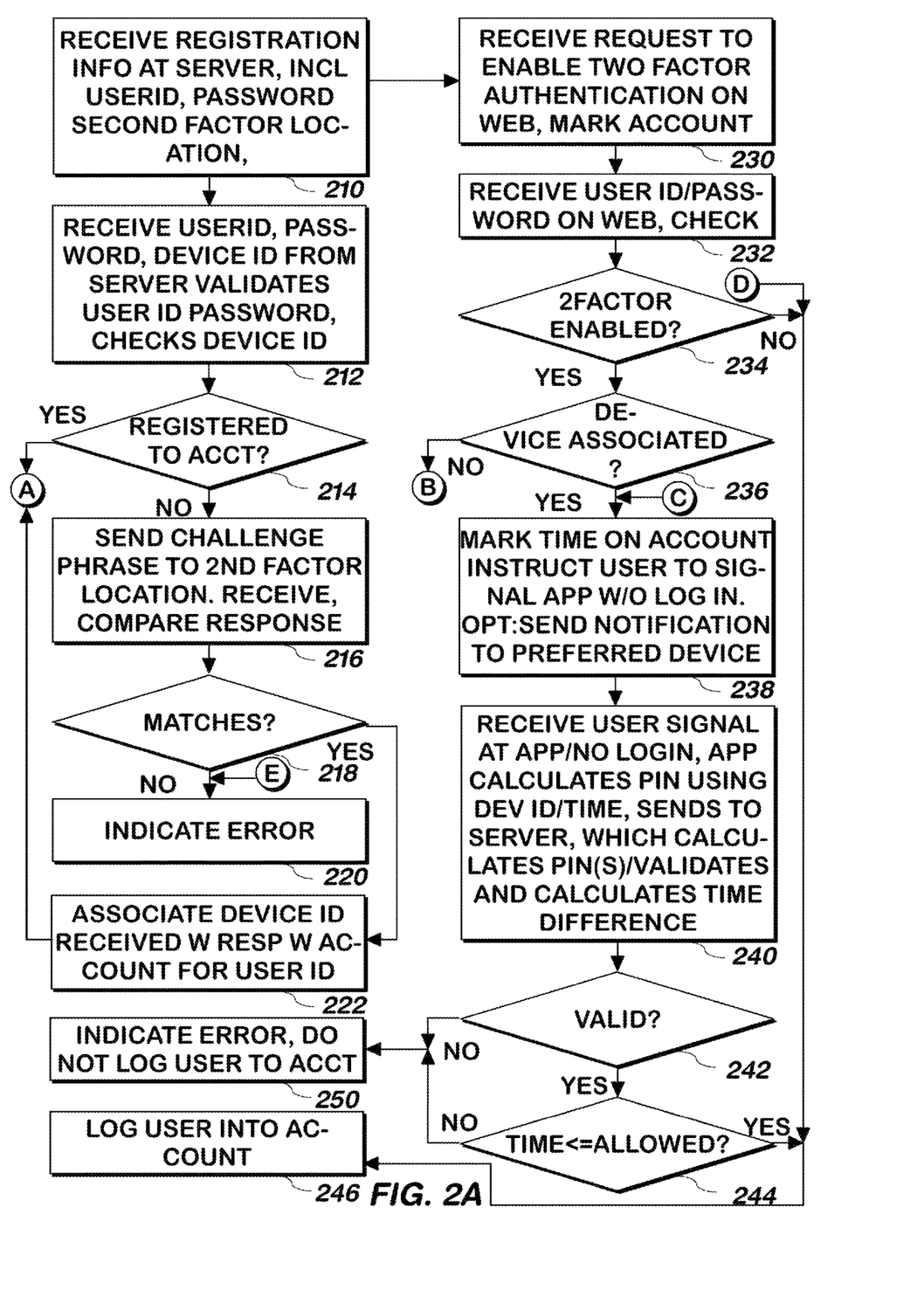

Once the account is added to the server, the user may log into the account via the web and any computer at any time using conventional techniques via the user identifier and password, as described in more detail below.

Add App to Account.

At any time after the account on the server has been set up, a user may link an app installed on a mobile or other device to the account on the server, for example, by logging into the account via the app. The app may be downloaded from a conventional play store and installed on a mobile device using a conventional play store app on the mobile device. To link the app to an account or log in, the user provides, and the app receives, their user identifier and password, and the app retrieves from the device the unique device identifier (e.g. IMEI number) assigned to the device, and forwards to the server the user identifier, password and device identifier, all in encrypted form using conventional techniques 212.

The server receives and decrypts such information, locates the account using the user identifier and compares the password to the one previously received or otherwise assigned to the account and if the password is the password assigned to the account, the server checks the device identifier to determine whether the device identifier is associated with the account 212. If the password doesn't match or there is no account with the user identifier, an error is indicated to the app by the server and the app informs the user to retry via steps not shown in the Figure.

Figure 2B:
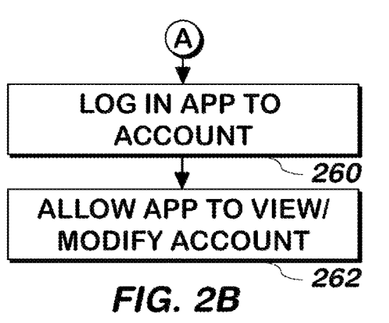

If an account with the user identifier exists and has a password matching the one the user supplied, if the device is already associated (i.e. registered) to the account 214, the app is logged into the account 260 and the app is allowed access to view or modify the information associated with the account 262, the latter steps being shown in FIG. 2B. If the user identifier exists and the password matches but the device is not associated with the account 214, a challenge phrase is sent to the two factor location specified in step 210 and the phrase is entered by the user to the app, which forwards to the server the received phrase and the device identifier, encrypted as described herein, and the server decrypts and compares the response to the phrase sent 216.

If the received phrase does not match the one sent 218, an error is indicated and the user may restart at step 212. If the received phrase matches the one sent 218, and optionally the device identifier matches the one from which the initial attempt to log in was made, the device identifier is associated at the server with the account corresponding to the user identifier and the method continues at step 260. The user may associate any number of devices with the account in this manner, using an app on each device.

Activate Two Factor Authentication of Web Interface.

At any time, the user may activate two factor authentication on the account 230. The user may perform this function while logged in via the web or via the app as described herein. In the case of activation via the app, the app informs the server and provides the device identifier, which the server uses to locate the account, which is associated with the device identifier. The server marks at the server the account as requiring two factor authentication. The user may also toggle the activation off via the web or via the app.

Log Into Account on Web.

At any time, the user may log in to his or her account on the web. The user supplies their user identifier and password or uses any other conventional log in technique 232. Step 232 includes validating the user identifier and password, and rejecting the user if there is no user identifier matching the one supplied or the password received on the account matching the user identifier doesn't match the password received. If the user is authenticated, the server also checks to determine if the account is marked for two factor identification, as described above, as part of step 232. If the account is not marked for two factor authentication 234, the user is logged into the account corresponding to the user identifier received 246 and the user can view of change information in the account.

Two Factor Authentication With No App Associated With Account.

Figure 2C:
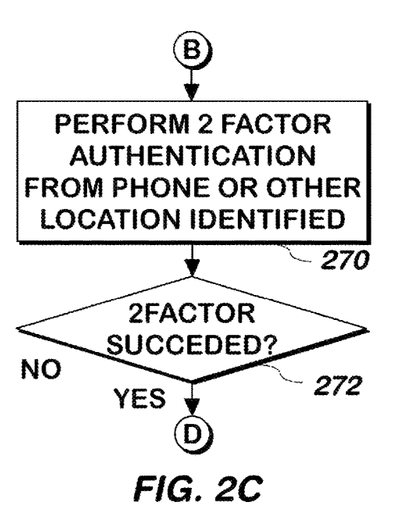

If the account, authenticated as described above is marked for two factor authentication 234, if there is no device associated with the account 236, conventional two factor authentication is performed 270 using the phone or text message or other location specified in step 210 that is associated with the account for which the user provided the user identifier and valid password. If the two factor authentication succeeds 272, the method continues at step 246, and otherwise 276, the user is instructed of the error 220 and may retry.

Two Factor Authentication with at Least One App Associated with Account.

If at least one device is associated with the account authenticated as described above 236, the current date and time, such as may be received from a time server or an operating system is associated with the account and the user is instructed to signal using any app registered to the account 238.

In one embodiment, the user may signal the app without logging in to it. The user may open the app and navigate to a page on the app that allows the user to indicate that he or she has the device containing the app. In one embodiment, a number is displayed to the user on the website that the user enters to the app on that page to signal that they have the app, and in another embodiment, the user simply clicks a button or menu item on the app without logging in. The button may be on the login screen that the user can use to log in to the app.

Figure 2D:
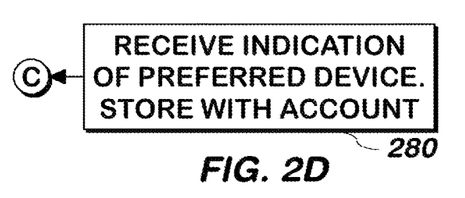

In one embodiment, at any time, the user may specify to the app that the device containing the app is a preferred device after the user has logged in using the app 280. The user may provide this indication if there is more than one app the user has used to log into his or her account as described herein. The app provides to the server an indication that it is a preferred device along with the device identifier. The server records the device identifier as the preferred device, replacing any previously stored device identifier of a prior-specified preferred device. In one embodiment, the first device used to access an account is registered as, or considered to be, the preferred device, or is so registered until a second device is associated with the account, at which point no device will be registered as the preferred device until the user registers it as described herein. In one embodiment, the server sends a notification to the preferred device associated with the account to which the user is attempting to log in and when the user clicks on the notification, the app will open to the page that allows the user to signal as described herein.

The app receives the signal, optionally without the user supplying their password and/or user identifier that would have been required to log in, and the app calculates a PIN and sends the PIN to the server, optionally with the device identifier, and optionally encrypted. The server decrypts the PIN and optionally the device identifier, calculates the PIN, and compares the calculated PIN with the PIN it received. In the embodiment in which the device identifier is not received with the PIN, the server calculates the PIN for all accounts for which it is waiting to receive one, and if the device identifier is received, it calculates the PIN using the device identifier.

In one embodiment, the PIN is a function of the device identifier and the date and time that the device and the server retrieves from a date and time server. In one embodiment, the date and time is rounded to the nearest one minute period, and the server will accept as valid a PIN that uses the current minute or the one before, calculating both PINs and accepting a match from either one 242. The server also calculates the difference in time between the current time and the time recorded with the account, and compares the difference to a threshold.

If the server determines the PIN is valid 242, and the time difference is less than the threshold 244, the server logs the user into the account via the web interface the user used to supply the user identifier and password 246. If the PIN is not valid 242 or not supplied within the threshold amount of time 246, the method continues at step 250.

System.

System elements may implement the features of the present invention. The system elements identified as storage may include memory or disk storage and may include a conventional database. Other system elements may be implemented as dedicated circuitry to perform the various functions described herein or may use a hardware processor running a stored computer program. Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Figure 3:
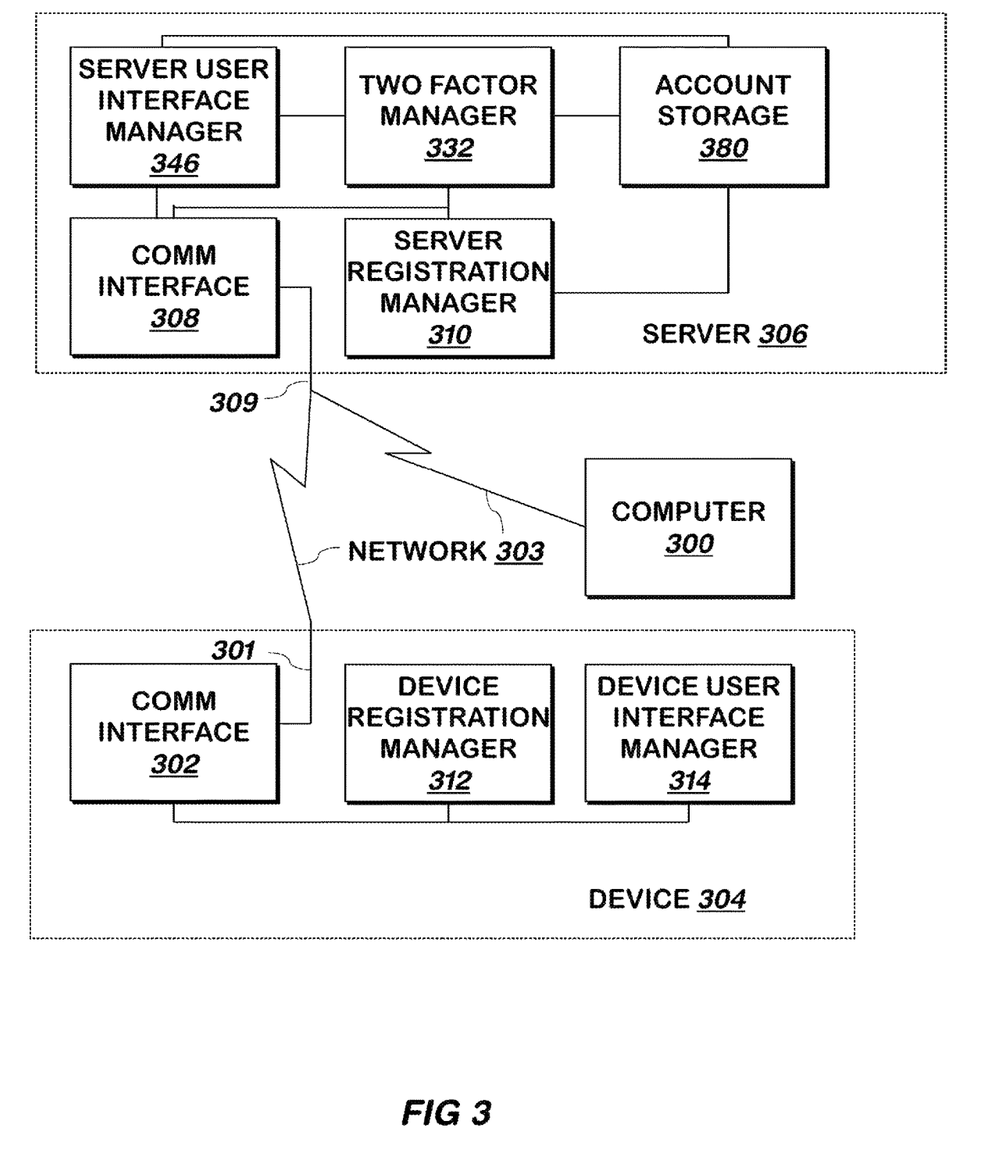
FIG. 3 is a block schematic diagram of a system for authenticating a user to a web interface according to one embodiment of the present invention.

Referring now to FIG. 3 a three computer system for authenticating a user is shown according to one embodiment of the present invention. Device 304 is coupled to server 306 via communication interfaces 302 and 308, each being conventional communication interfaces for a mobile device such as a smartphone or tablet, or a computer web server, respectively, and all communication between them is sent via such interfaces 302 and 308. Each has an input/output 301, 309 that is coupled to a network 303 that may include an Ethernet network, the networks of the Internet and a cellular network. To access server 306 via the web, the user may use computer system 300, which may be a personal computer system or any smart device running a browser that is coupled to network 303 including the networks of the internet using a conventional TCP/IP-compatible communication interface. There may be any number of users using any number of computers 300 and devices 304.

Server registration manager 310 receives or provides or both, registration information at a server, such as username and password, which server registration manager stores into account storage 380 (and/or stores other information that can be used to authenticate the user using them). Server registration manager may receive other information, such as an e-mail address or cell phone number of each user, of which any number may use server registration manager 310 using their own computer systems 300.

At any time, the user can also log into their account via an application (also referred to as an "app") on a smart device using the same username and password they registered via the web interface described above. Device registration manager 312 allows the user to enter the username and password registered as described above, and device registration manager 312 sends the username encrypted, and information that can be used to verify the password, such as a phrase encrypted with the password or the password, encrypted, and an encrypted version of the device identifier to server registration manager 310 which validates the user identifier and password and determines whether the device identifier is associated with the account in account storage 380. If not, server registration manager 310 signals two factor manager 332 with an indication to challenge the user using conventional two factor techniques, and provides the account identifier the user logged into and the device identifier.

When signaled, two factor manager 332 uses registration information that was previously received from the user and stored into account storage 380 by server registration manager 310, such as a phone number or e-mail address, to send an e-mail or a text message containing a challenge phrase that two factor manager 332 stores in account storage 380 associated with the account, along with the date and time (retrieved from an operating system, not shown) and the device identifier. The user enters the challenge phrase into a user interface element provided by device registration manager 312. Device registration manager 312 provides the challenge phrase and the encrypted device identifier to two factor manager 332, which decodes the device identifier, locates the account using the device identifier and checks that the challenge phrase matches the one sent. If it matches, two factor manager 332 retrieves the current date and time, compares it to the date and time stored with the account, and if it is within a threshold amount of time, marks the device identifier stored in account storage 380 as being associated with the account, and marks the account in account storage 380 as being authenticated for access by that device and so indicates to device registration manager 312. Device registration manager 312 then signals device user interface manager 314 which allows the user to perform conventional account functions via the app.

At any time, the user may request two factor authentication as a further means of authenticating the user when the user logs into their account using any method or logs into their account via the web by signaling a user interface control provided by server registration manager 310. When the user operates the user interface control, server registration manager 310 marks the account in account storage 380 as requiring two factor authorization.

Each time the user authenticates himself or herself to server registration manager 310 using any computer and a browser such as personal computer 300 as described above, server registration manager 310 checks the account in account storage to see if it is marked as requiring two factor authentication. If not, registration manager 310 marks the user as logged in in account storage 380 and transfers the user session to server user interface manager 346, and otherwise, provides the account identifier to two factor manager 332. Server user interface manager 346 performs any conventional web function associated with an account.

When it receives the account identifier, two factor manager 332 checks the account to determine whether a device has been associated with the account. If not, two factor manager 332 uses the conventional two factor authentication technique described above to further authenticate the user via e-mail or text messaging or the like and if successful, marks the account as logged in in account storage 380 and transfers control to server user interface manager 346. If a device has been associated with the account, two factor manager 332 indicates to the user to use the device to further authenticate himself or herself.

The user then navigates to a display on the app (which may be the first page displayed) and operates a user interface control provided by device user interface manager 314 that it displays on the device using its operating system. In one embodiment, the user is not required to authenticate himself or herself to the app or server to operate such user interface control, though he or she is required to authenticate himself or herself to perform other functions on the account. When the user interface control is operated, device user interface manager 314 encodes the date and/or time and the device identifier that it retrieves from the operating system of the device (not shown), and sends such encoded information to two factor manager 332, which performs the same encoding (optionally using times with precisions of minutes and optionally producing several encodings with nearby times) and compares the received encoding with the one or ones it calculates, and if any of them match, two factor manager 332 marks the account as logged in in account storage and transfers control to server user interface manager 346. The user can then use personal computer 300 to request server user interface manager 346 to perform conventional web functions using the account information in account storage 380 and other functions, some or all of which are not available to the user until they are marked as logged in.

As noted above, in one embodiment, when it receives the account identifier, two factor manager 332 looks up the device identifier in account storage 380 using the account identifier, and sends a notification to the device, that indicates the app should display the screen or page with the user interface control to allow the user to further authenticate himself or herself via the app as described above. The operating system displays the notification and a means to operate it, and if the notification is operated, the operating system starts the app and indicates the above referenced screen or page should be displayed to device user interface manager 314 and device user interface manager 314 displays the page.

In another embodiment, operating the notification causes device user interface manager 314 to act as if the user interface control the user would have pressed to authenticate himself or herself has been operated instead of displaying the screen or page with the user interface control. The notification so indicates instead of indicating the screen or page with the user interface control should be displayed.

In one embodiment, if multiple apps on multiple devices are associated with an account, server user interface manager 346 provides a user interface that lists all such devices and device names that are sent with the device identifier by device registration manager 312 and stored with the device identifier by server registration manager 310. The user can select one of these devices as a preferred device to use for two factor authentication via the app as described herein and such information is stored by server user interface manager 346 into account storage 380. Two factor manager 332 then sends the notification to that device, as described above.

Certain Embodiments of the Present Invention

Described is a method of authenticating a user on a web site, including:

authenticating for account access at a server the user on the web site at a first time;

authenticating at the server the user via an application on a mobile device to access the account;

providing by the server a first code to be displayed to the user to enter to an application on a mobile device;

receiving at the server the first code from the user via the application on the mobile device, along with a unique device mobile identifier;

associating the mobile device identifier with the account in response to the receipt of the first code;

at a second time, later than the first time, authenticating the user on the web site but restricting access to at least one function on the web site that will be granted if the user further authenticates himself or herself using the application;

receiving at the server a second code from the mobile device that is generated by the application in response to a signal made by the user to the application, the code being generated using the mobile device identifier and the date and/or time;

generating at the server at least one third code using the mobile device identifier and at least one date and/or time;

comparing by the server the second code with the at least one third code to determine whether one of the at least one third codes matches the second code; and granting access to the at least one function on the web site if one of the at least one third code matches the second code.

The method may contain additional features, whereby the generating the at least one third code comprises generating two or more third codes using two or more dates and/or times.

The method may additionally include notifying the user to signal the application in response to the authenticating at the second time.

The method may contain additional features, whereby the signal made by the user is operation of a user interface element provided by the application.

The method may contain additional features, whereby the user interface element is provided by the application without requiring the user to authenticate himself or herself to the application.

The method may contain additional features, whereby the signal is activating a notification provided by an operating system on which the application runs.

Described is a system for authenticating a user on a web site, including:

a server registration manager at a server having an input for receiving authentication information, the server registration manager for authenticating for account access the user on the web site at a first time using the authentication information, the server registration manager input coupled to an output of a device registration manager of an application on a mobile device, the device registration manager for providing at the device registration manager output an additional instance of the authentication information received from the user at the device registration manager input, the server registration manager additionally for authenticating the user for account access using the second instance of the authentication information;

a two factor manager at the server for generating and providing at an output a first code to be displayed to the user to enter to the device registration manager input, the device registration manager additionally for providing at the device registration manager output a unique identifier of the mobile device, and the first code received from the user at the device registration manager input, the two factor manager having an input coupled to the device registration manager output for receiving the identifier of the mobile device and the first code, and for associating via an input/output the identifier of the mobile device with the account in response to the receipt of the first code;

the server registration manager additionally for, at a second time, later than the first time, authenticating, using a third instance of the registration information received at the server registration manager input, the user on the web site but restricting access to at least one function on the web site that will be granted if the user further authenticates himself or herself using the application;

the two factor manager additionally for receiving at the two factor manager input a second code from the mobile device that is generated by a device user interface manager and provided at a device user interface manager output coupled to the server registration manager input in response to a signal at least initiated by the user and received at the two factor manager input, the code being generated using the mobile device identifier and the date and/or time, the server registration manager for generating at least one third code using the mobile device identifier and at least one date and/or time, and for comparing the second code with the at least one third code to determine whether one of the at least one third codes matches the second code and for providing at the two factor manager output an indication in response to the second code matching at least one of the at least one third code; and a server user interface manager having an input coupled to the two factor manager output for receiving the indication, the server user interface manager for granting access via an input/output to the at least one function on the web site by the user responsive to the indication.

The system may contain additional features, whereby the generating the at least one third code comprises generating two or more third codes using two or more dates and/or times.

The system may contain additional features, whereby:

the server registration manager provides at the server registration manager output a notice responsive to the authenticating using the third instance;

the two factor manager input is additionally coupled to the server registration manager output, and the two factor manager is additionally for receiving the notice at the two factor manager input and for, in response to the notice notifying via the two factor manager output the user to signal the application in response to the authenticating at the second time.

The system of claim 7 may contain additional features, whereby the signal at least initiated by the user is at least initiated by operation of a user interface element provided by the device user interface manager output to a display of the device.

The system may contain additional features, whereby the user interface element is provided by the device user interface manager without requiring the user to authenticate himself or herself to the application.

The system may contain additional features, whereby the signal is at least initiated by the user by activating a notification provided by an operating system on which the application runs.

Described is a computer program product including a computer useable medium having computer readable program code embodied therein for authenticating a user on a web site, the computer program product including computer readable program code devices configured to cause a computer system to:

authenticate for account access at a server the user on the web site at a first time;

authenticate at the server the user via an application on a mobile device to access the account;

provide by the server a first code to be displayed to the user to enter to an application on a mobile device;

receive at the server the first code from the user via the application on the mobile device, along with a unique device mobile identifier;

associate the mobile device identifier with the account in response to the receipt of the first code;

at a second time, later than the first time, authenticate the user on the web site but restrict access to at least one function on the web site that will be granted if the user further authenticates himself or herself using the application;

receive at the server a second code from the mobile device that is generated by the application in response to a signal made by the user to the application, the code being generated using the mobile device identifier and the date and/or time;

generate at the server at least one third code using the mobile device identifier and at least one date and/or time;

compare by the server the second code with the at least one third code to determine whether one of the at least one third codes matches the second code; and grant access to the at least one function on the web site if one of the at least one third code matches the second code.

The computer program product may contain additional features, whereby the computer program product including computer readable program code devices configured to cause the computer system to generate the at least one third code comprise computer program product including computer readable program code devices configured to cause the computer system to generate two or more third codes using two or more dates and/or times.

The computer program product may additionally include computer program product including computer readable program code devices configured to cause the computer system to notify the user to signal the application in response to the authenticating at the second time.

The computer program product may contain additional features, whereby the signal made by the user is operation of a user interface element provided by the application.

The computer program product may contain additional features, whereby the user interface element is provided by the application without requiring the user to authenticate himself or herself to the application.

The computer program product may contain additional features, whereby the signal is activating a notification provided by an operating system on which the application runs.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

What is claimed is:

1. A method of authenticating a user on a web site, comprising:

authenticating for account access at a server, the user on the web site at a first time;

authenticating at the server, the user, via an application on a mobile device to access an account;

providing by the server a first code to be displayed to the user to enter to the application on a mobile device;

receiving at the server the first code from the user via the application on the mobile device, along with a unique mobile device identifier;

associating the mobile device identifier with the account in response to the receipt of the first code;

at a second time, later than the first time, authenticating the user on the web site but restricting access to at least one function on the web site that will be granted if the user further authenticates himself or herself using the application;

receiving at the server a second code from the mobile device that is generated by the application in response to a signal made by the user to the application, said code being generated using the mobile device identifier and a date and/or time;

generating at the server at least one third code using the mobile device identifier and at least one date and/or time;

comparing by the server the second code with the at least one third code to determine whether one of the at least one third codes matches the second code; and granting access to the at least one function on the web site if one of the at least one third code matches the second code.

2. The method of claim 1, wherein the generating the at least one third code comprises generating a plurality of third codes using a plurality of dates and/or times.

3. The method of claim 1, additionally comprising notifying the user to signal the application in response to the authenticating at the second time.

4. The method of claim 1, wherein the signal made by the user is operation of a user interface element provided by the application.

5. The method of claim 4, wherein the user interface element is provided by the application without requiring the user to authenticate himself or herself to the application.

6. The method of claim 1, wherein the signal is activating a notification provided by an operating system on which the application runs.

7. A system for authenticating a user on a web site, comprising:

a server registration manager at a server having an input for receiving authentication information, the server registration manager for authenticating for account access, the user on the web site at a first time using the authentication information, the server registration manager input coupled to an output of a device registration manager of an application on a mobile device, the device registration manager for providing at the device registration manager output an additional instance of the authentication information received from the user at a device registration manager input, the server registration manager additionally for authenticating the user for account access using the second instance of the authentication information;

a two factor manager at the server for generating and providing at an output a first code to be displayed to the user to enter to the device registration manager input, the device registration manager additionally for providing at the device registration manager output a unique identifier of the mobile device, and the first code received from the user at the device registration manager input, the two factor manager having an input coupled to the device registration manager output for receiving the identifier of the mobile device and the first code, and for associating via an input/output the identifier of the mobile device with the account in response to the receipt of the first code;

the server registration manager additionally for, at a second time, later than the first time, authenticating, using a third instance of the registration information received at the server registration manager input, the user on the web site but restricting access to at least one function on the web site that will be granted if the user further authenticates himself or herself using the application;

the two factor manager additionally for receiving at the two factor manager input a second code from the mobile device that is generated by a device user interface manager and provided at a device user interface manager output, coupled to the two factor manager input, in response to a signal at least initiated by the user and received at the two factor manager input, said code being generated using the mobile device identifier and a date and/or time, the two factor manager for generating at least one third code using the mobile device identifier and at least one date and/or time, and for comparing the second code with the at least one third code to determine whether one of the at least one third codes matches the second code and for providing at the two factor manager output an indication in response to the second code matching the at least one of the at least one third code; and a server user interface manager having an input coupled to the two factor manager output for receiving the indication, the server user interface manager for granting access via an input/output to the at least one function on the web site to the user responsive to the indication.

8. The system of claim 7, wherein the generating the at least one third code comprises generating a plurality of third codes using a plurality of dates and/or times.

9. The system of claim 7, wherein:
the server registration manager provides at a server registration manager output a notice responsive to the authenticating using the third instance;
the two factor manager input is additionally coupled to the server registration manager output, and the two factor manager is additionally for receiving the notice at the two factor manager input and for, in response to the notice, notifying via the two factor manager output the user to signal the application in response to the authenticating at the second time.

10. The system of claim 7, wherein the signal at least initiated by the user is at least initiated by operation of a user interface element provided by the device user interface manager output to a display of the mobile device.

11. The system of claim 10, wherein the user interface element is provided by the device user interface manager without requiring the user to authenticate himself or herself to the application.

12. The system of claim 7, wherein the signal is at least initiated by the user by activating a notification provided by an operating system on which the application runs.

13. A computer program product comprising a nontransitory computer useable medium having computer readable program code embodied therein for authenticating a user on a web site, the computer program product comprising computer readable program code devices configured to cause a computer system to:
authenticate for account access at a server, the user on the web site at a first time;
authenticate at the server, the user, via an application on a mobile device to access an account;
provide by the server a first code to be displayed to the user to enter to the application on a mobile device;
receive at the server the first code from the user via the application on the mobile device, along with a unique mobile device identifier;
associate the mobile device identifier with the account in response to the receipt of the first code;
at a second time, later than the first time, authenticate the user on the web site but restrict access to at least one function on the web site that will be granted if the user further authenticates himself or herself using the application;
receive at the server a second code from the mobile device that is generated by the application in response to a signal made by the user to the application, said code being generated using the mobile device identifier and a date and/or time;
generate at the server at least one third code using the mobile device identifier and at least one date and/or time;
compare by the server the second code with the at least one third code to determine whether one of the at least one third codes matches the second code; and
grant access to the at least one function on the web site if one of the at least one third code matches the second code.

14. The computer program product of claim 13, wherein the computer program product comprising computer readable program code devices configured to cause the computer system to generate the at least one third code comprise computer program product comprising computer readable program code devices configured to cause the computer system to generate a plurality of third codes using a plurality of dates and/or times.

15. The computer program product of claim 13, additionally comprising computer program product comprising computer readable program code devices configured to cause the computer system to notify the user to signal the application in response to the authenticating at the second time.

16. The computer program product of claim 13, wherein the signal made by the user is operation of a user interface element provided by the application.

17. The computer program product of claim 16, wherein the user interface element is provided by the application without requiring the user to authenticate himself or herself to the application.

18. The computer program product of claim 13, wherein the signal is activating a notification provided by an operating system on which the application runs.

* * * * *